United States Patent
Komine et al.

(10) Patent No.: US 8,891,158 B2
(45) Date of Patent: Nov. 18, 2014

(54) DISTRIBUTED THERMAL SYSTEM FOR NONLINEAR OPTICAL FREQUENCY CONVERSION

(71) Applicants: Hiroshi Komine, Torrance, CA (US); Joseph M. Fukumoto, Rancho Palos Verdes, CA (US); Chun-Ching Shih, Palos Verdes Estates, CA (US); William H. Long, Torrance, CA (US)

(72) Inventors: Hiroshi Komine, Torrance, CA (US); Joseph M. Fukumoto, Rancho Palos Verdes, CA (US); Chun-Ching Shih, Palos Verdes Estates, CA (US); William H. Long, Torrance, CA (US)

(73) Assignee: Northrup Grumman Systems Corporation, Falls Church, VA (US)

( * ) Notice: Subject to any disclaimer, the term of this patent is extended or adjusted under 35 U.S.C. 154(b) by 56 days.

(21) Appl. No.: 13/916,266

(22) Filed: Jun. 12, 2013

(65) Prior Publication Data

US 2014/0268306 A1    Sep. 18, 2014

Related U.S. Application Data

(60) Provisional application No. 61/791,643, filed on Mar. 15, 2013.

(51) Int. Cl.
| | | |
|---|---|---|
| *G02F 1/35* | (2006.01) | |
| *H01S 5/00* | (2006.01) | |
| *G02F 1/355* | (2006.01) | |
| *G02F 1/365* | (2006.01) | |
| *B82Y 20/00* | (2011.01) | |

(52) U.S. Cl.
CPC .............. *G02F 1/3556* (2013.01); *G02F 1/353* (2013.01); *G02F 1/365* (2013.01); *B82Y 20/00* (2013.01); *Y10S 977/755* (2013.01); *G02F 2001/3507* (2013.01); *G02F 2201/16* (2013.01); *G02F 2203/60* (2013.01)
USPC ........ 359/326; 359/328; 372/22; 372/50.121; 977/755

(58) Field of Classification Search
USPC .................................................. 359/326–328
See application file for complete search history.

(56) References Cited

U.S. PATENT DOCUMENTS

| | | | |
|---|---|---|---|
| 3,856,379 A | 12/1974 | Burns et al. | |
| 5,131,002 A | 7/1992 | Mooradian | |

(Continued)

FOREIGN PATENT DOCUMENTS

| | | |
|---|---|---|
| EP | 0 919 852 | 6/1999 |
| EP | 2 216 677 | 8/2010 |
| WO | 03/058337 | 7/2003 |

OTHER PUBLICATIONS

Article "Harmonic Generations in Coupled Quantum Wells with Few-Cycle Pulses" Zhang et al., Oct. 2011, pp. 418-420.

(Continued)

*Primary Examiner* — Hemang Sanghavi
(74) *Attorney, Agent, or Firm* — Tarolli, Sundheim, Covell & Tummino LLP

(57) ABSTRACT

A laser frequency converter includes a first substrate material forming a first planar surface that includes a first nonlinear material situated along a portion of the first planar surface of the first substrate material to perform a frequency conversion of a laser signal. The frequency converter includes a second substrate material forming a second planar surface and separated by a distance from the first planar surface of the first substrate material. The second substrate material includes a second nonlinear material situated along a portion of the second planar surface of the second substrate material to perform the frequency conversion of the laser signal in conjunction with the first non-linear material. The second nonlinear material is offset from the first nonlinear material along an axis of propagation for the laser signal.

20 Claims, 4 Drawing Sheets

(56) References Cited

U.S. PATENT DOCUMENTS

| | | |
|---|---|---|
| 5,230,029 A | 7/1993 | Mendenhall et al. |
| 7,612,934 B2 * | 11/2009 | Bragg et al. ............ 359/328 |
| 2007/0230519 A1 | 10/2007 | Heo et al. |
| 2008/0128727 A1 | 6/2008 | Erchak et al. |
| 2008/0310010 A1 * | 12/2008 | Kinoshita ............ 359/326 |
| 2009/0154508 A1 | 6/2009 | Chou et al. |
| 2013/0093362 A1 * | 4/2013 | Edwards ............ 315/313 |

OTHER PUBLICATIONS

Article "Optical Second Harmonic Generation Study of Vicinal Si(111) Surfaces", Jul. 1991, pp. 467-471.

* cited by examiner

DISTRIBUTED THERMAL SYSTEM FOR NONLINEAR OPTICAL FREQUENCY CONVERSION

CROSS-REFERENCE TO RELATED APPLICATION

This application claims the benefit of U.S. Provisional Patent Application 61/791,643 filed on Mar. 15, 2013, and entitled DISTRIBUTED THERMAL SYSTEM FOR NON-LINEAR OPTICAL FREQUENCY CONVERSION, the entirety of which is incorporated by reference herein.

TECHNICAL FIELD

This disclosure relates to laser systems, and more particularly to systems that utilize distributed placement of nonlinear optical components to perform frequency conversion for lasers.

BACKGROUND

Nonlinear optics (NLO) is a branch of optics that describes the behavior of light in nonlinear media. The nonlinear media has the characteristic where the dielectric polarization P responds nonlinearly to the electric field E of the light. This nonlinearity is typically only observed at very high light intensities (e.g., values of the electric field comparable to inter-atomic electric fields, typically $10^8$ V/m) such as those provided by pulsed lasers. When applying a laser signal source to a nonlinear media or material, various changes to the applied laser signal can occur. Notably, such changes can affect the frequency or wavelength of the laser signal as it passes through the given nonlinear media. As such, one application for the use of nonlinear materials is to perform frequency or wavelength conversion of laser signal sources (e.g., convert an incident laser signal having one frequency to a different frequency).

One of the most commonly used techniques of frequency conversion for lasers is via frequency doubling or second-harmonic generation. With this technique, a 1064-nm output from Nd:YAG lasers or an 800-nm output from Ti:sapphire lasers can be converted to visible light, with wavelengths of 532 nm (green) or 400 nm (violet), respectively. Frequency-doubling can be carried out by placing a nonlinear medium in a laser beam. While there are many types of nonlinear media, the most common media are crystals. Commonly used crystals are BBO (β-barium borate), KDP (potassium dihydrogen phosphate), KTP (potassium titanyl phosphate), and lithium niobate, for example. These crystals have the necessary properties of being strongly birefringent, of having a specific crystal symmetry and of being transparent for both the impinging laser light and the frequency doubled wavelength. In addition to crystals, many nonlinear semiconductor materials can be employed to perform the conversion.

One problem with conventional frequency converters for lasers is that some portion of the incident light from the laser source is absorbed along the beam path in the nonlinear media. As the laser signal passes through the nonlinear media, the absorbed laser energy turns into heat, which is then dissipated in the media causing thermal gradients to appear along the path of the laser signal. Such thermal gradients can lead to changes of the index of refraction in the nonlinear material and can thus adversely affect the performance of the nonlinear material and consequently, the associated frequency conversion.

SUMMARY

This disclosure relates to systems and methods for performing frequency conversion of laser signals. In one example, a laser frequency converter includes a first substrate material forming a first planar surface that includes a first nonlinear material situated along a portion of the first planar surface of the first substrate material to perform a frequency conversion of a laser signal. The frequency converter includes a second substrate material forming a second planar surface and separated by a distance from the first planar surface of the first substrate material. The second substrate material includes a second nonlinear material situated along a portion of the second planar surface of the second substrate material to perform the frequency conversion of the laser signal in conjunction with the first non-linear material. The second nonlinear material is offset from the first nonlinear material along an axis of propagation for the laser signal.

In another example, a laser frequency converter includes a first substrate material forming a first planar surface that includes a first nonlinear material situated along a portion of the first planar surface of the first substrate material to perform a frequency conversion of a laser signal. The first substrate material includes a first heat sink material coupled to the first substrate material to conduct heat from the first nonlinear material during the frequency conversion of the laser signal. A second substrate material forms a second planar surface and is separated by a distance from the first planar surface of the first substrate material. The second substrate material includes a second nonlinear material situated along a portion of the second planar surface of the second substrate material to perform the frequency conversion of the laser signal in conjunction with the first non-linear material. The second nonlinear material is offset from the first nonlinear material along an axis of propagation for the laser signal. The second substrate includes a second heat sink material coupled to the second substrate material to conduct heat from the second nonlinear material during the frequency conversion of the laser signal.

In yet another example, a laser frequency converter includes a first substrate material forming a first planar surface comprising a first coupled quantum well (CQW) situated along a portion of the first planar surface of the first substrate material to perform a frequency conversion of a laser signal. The first substrate material includes a first heat sink material coupled to the first substrate material to conduct heat from the first CQW during the frequency conversion of the laser signal. A second substrate material forms a second planar surface and is separated by a distance from the first planar surface of the first substrate material. The second substrate material includes a CQW situated along a portion of the second planar surface of the second substrate material to perform the frequency conversion of the laser signal in conjunction with the first CQW. The second CQW is offset from the first CQW along an axis of propagation for the laser signal. The second substrate material includes a second heat sink material coupled to the second substrate material to conduct heat from the second CQW during the frequency conversion of the laser signal.

DETAILED DESCRIPTION

This disclosure relates to laser frequency conversion systems and methods for high power laser sources (e.g., infrared sources) using nonlinear optical materials and devices. In one example, such nonlinear materials can be based on coupled quantum well (CQW) structures that address aperture scaling and average power handling capabilities. These structures can be situated in a staggered arrangement along opposing planes of substrate materials, wherein the staggered or offset arrangement allows heat to be uniformly removed along an axis of propagation for a laser signal. Such uniformity and distribution mitigates thermal gradients from being developed in the substrate materials and nonlinear structures and thus reduces distortions in the index of refraction for the laser signal which improves the efficiency of the frequency conversion.

In one example, a laser frequency conversion device is provided for high power infrared sources using engineered nonlinear optical materials based on coupled quantum well (CQW) structures. The laser frequency conversion device can include a pair of laser frequency conversion structures spaced apart from one another to form a gap (e.g., air, vacuum). A top laser conversion structure is offset from a bottom laser conversion structure to allow for an input laser beam to enter the gap at an angle such that the beam reflects back and forth between the top and bottom laser conversion structures in a zig-zag pattern, and exits the gap to provide a frequency converted output laser beam.

Each laser frequency conversion structure is formed with one or more nonlinear material frequency conversion layers in the form of one or more stacks of CQW structures overlying a semiconductor wafer (e.g., gallium arsenide wafer). The semiconductor wafer overlies a reflective layer disposed on a relatively thick conduction layer configured to remove heat caused by the interaction of the laser light beam with the laser conversion material layer. The reflective layer can be formed of about 10-100 layers of a dielectric stack of varying refractive indexes that allows the passing of heat but reflects light. The relatively thick conductive layer can be in the form of a copper heat sink or copper cooling block that allows for heat caused by the interaction with the laser light beam to be removed. Each interaction with the laser frequency conversion material layer improves the percentage of the frequency conversion to improve the overall frequency conversion efficiency of the laser light beam. Additionally, having multiple interactions with the laser frequency conversion material layer distributes the heat dissipation over a larger surface area, such that the heat transfer removal is more effective resulting in reduced distortion of the laser light beam during frequency conversion.

Figure 1:
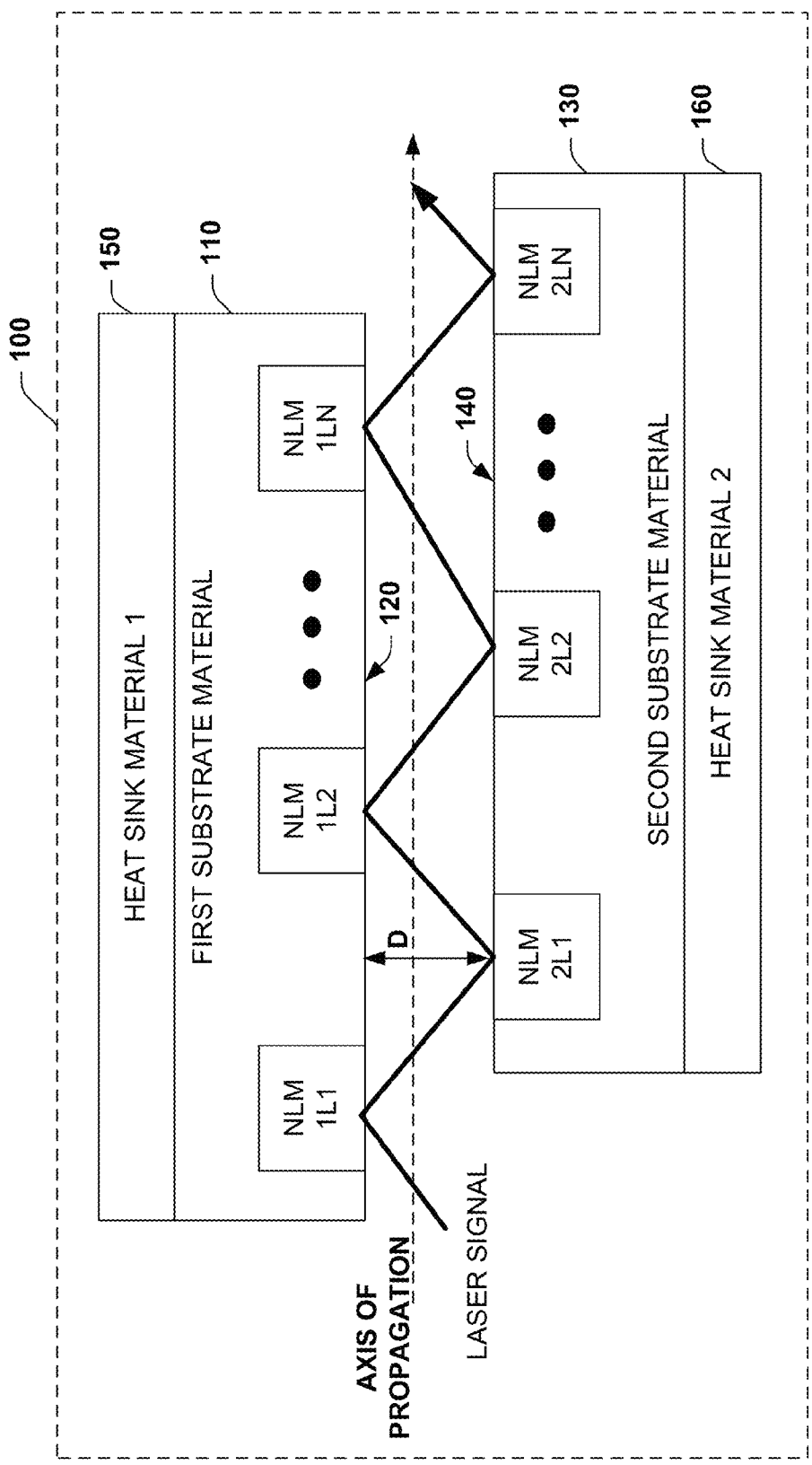
FIG. 1 illustrates a laser frequency converter that employs offset non-linear materials to facilitate thermal distribution in the converter.

FIG. 1 illustrates a laser frequency converter 100 that employs offset non-linear materials to facilitate thermal distribution in the converter. As used herein, the term frequency conversion includes converting one input laser frequency to an output frequency having a higher or lower frequency after the conversion. This includes the term wavelength conversion where a laser having an input signal wavelength is converted to an output signal wavelength having a longer or shorter wavelength after the conversion.

The laser frequency converter 100 includes a first substrate material 110 that forms a first planar surface 120. The first substrate material 110 includes nonlinear material structures situated along a portion of the first planar surface 120 of the first substrate material to perform a frequency conversion of a laser signal. The nonlinear material (NLM) structures are shown as NLM 1L1, NLM 1L2, and NLM 1LN which is an acronym for nonlinear material (NLM) $1^{st}$ layer structure 1, NLM $1^{st}$ layer structure 2, and NLM $1^{st}$ layer structure N with N representing a positive integer of nonlinear structures situated along the first planar surface 120. A second substrate material 130 forms a second planar surface 140 separated by a distance (labeled D) from the first planar surface 120 of the first substrate material 110. The second substrate material 130 includes nonlinear material structures (shown as NLM 2L1, NLM 2L2, and NLM 2LN) situated along a portion of the second planar surface 140 of the second substrate material 130 to perform the frequency conversion of the laser signal. The structures NLM 1L1 though NLM 1LN of the first substrate material 110 and NLM 2L1 though NLM 2LN of the second substrate material 130 work in conjunction with each other and are offset from each other along an axis of propagation (shown as dotted propagation line) for the laser signal.

The offset between nonlinear structures can include complete offsets where there is no overlap between the nonlinear structures of the first substrate material 110 and the nonlinear structures in second substrate material 130. In another example, there can be partial offsets between the nonlinear structures where some overlap between the structures across the opposite planes 120 and 140 may exist. As shown, the offset nonlinear structures on each plane 120 and 140 cause a distributed pattern of independent frequency converters (collectively operating as the frequency converter 100) which causes the laser signal to propagate through the frequency converter 100 in a zig-zag pattern. This pattern is caused by an angular beam entry of the laser signal into the frequency converter 100 followed by the distributed offset arrangement of nonlinear structures between planes 120 and 140. Such arrangement also allows heat generated in the nonlinear structures to be dissipated in a uniform manner along the axis of propagation in the frequency converter 100. Such distributed pattern of nonlinear structures along the axis of propagation facilitates uniform heat dissipation to mitigate distortion in the index of refraction which improves the efficiency of the frequency converter 100.

The distributed arrangement of nonlinear structures on the planes 120 and 140 enables larger beam sizes and for handling larger average power heat loads. This can be achieved by utilizing distributed stacks of coupled quantum wells (CQW) material for the nonlinear material (See e.g., FIG. 2) in a quasi-phase matched (QPM) arrangement and placing the CQW structures on the side faces 120 and 140 of a slab laser structure, for example. As shown, the laser signal follows a zig-zag path along the axis of propagation in the frequency converter 100. Heat deposited in the nonlinear structures can effectively be removed by heat sinks applied to the substrate materials 110 and 130.

As shown, a first heat sink material 150 can be coupled to the first substrate material 110 to conduct heat from the nonlinear material structures during the frequency conversion of the laser signal. A second heat sink material 160 can be coupled to the second substrate material 130 to conduct heat from the second nonlinear material during the frequency conversion of the laser signal. The heat sink material 150 and 160 on the respective layers can be deposited as a metallic layer such as copper, for example to dissipate heat from the nonlinear structures during the conversion. The distance D is typically maintained uniformly along the axis of propagation to provide a parallel orientation between the planes 120 and 140. Such distance can be filled by a gas such as air in one example or can be a vacuum in another example.

Figure 2:
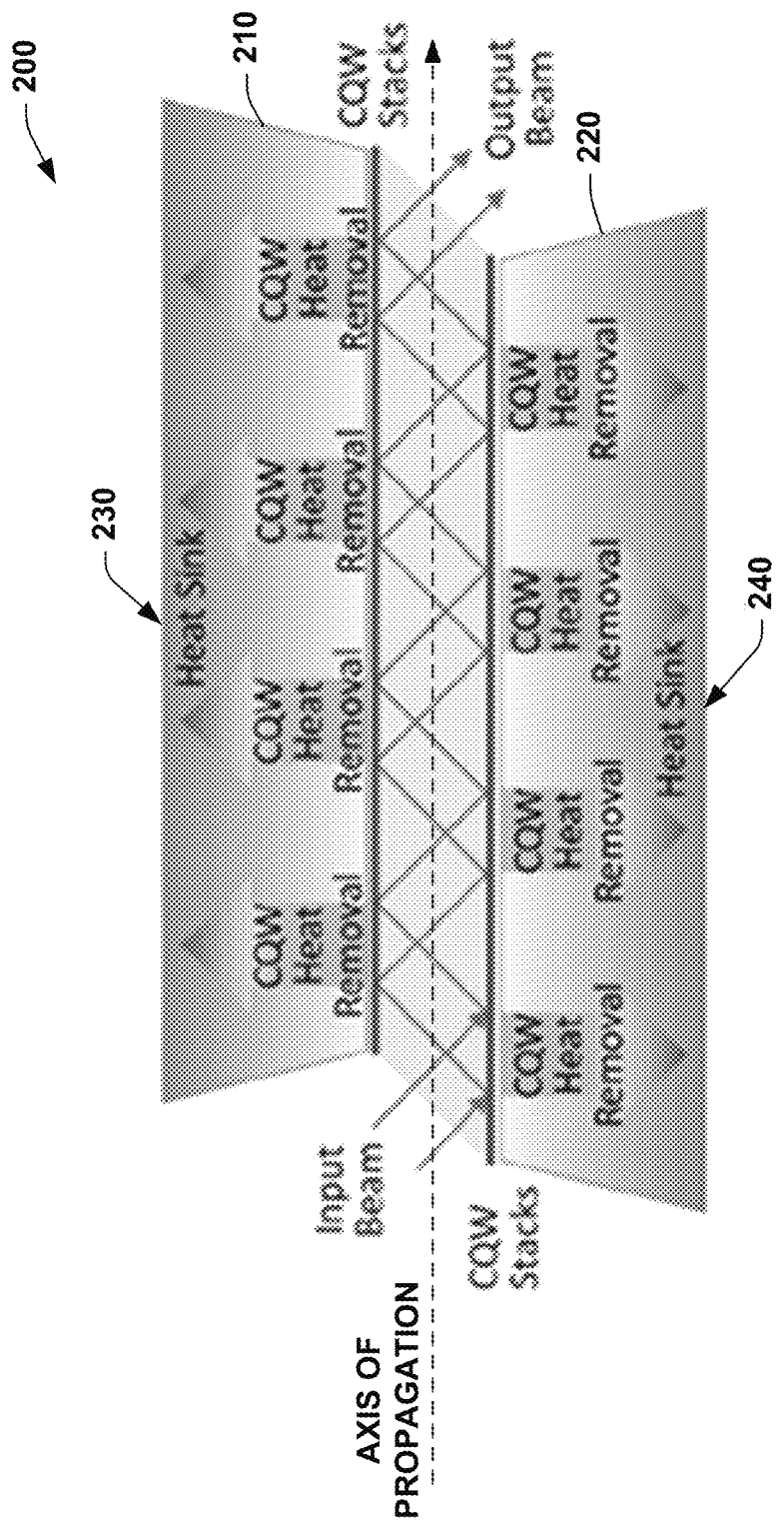
FIG. 2 illustrates a laser frequency converter that employs offset coupled quantum wells (CQW) to facilitate thermal distribution in the converter.
Figure 4:
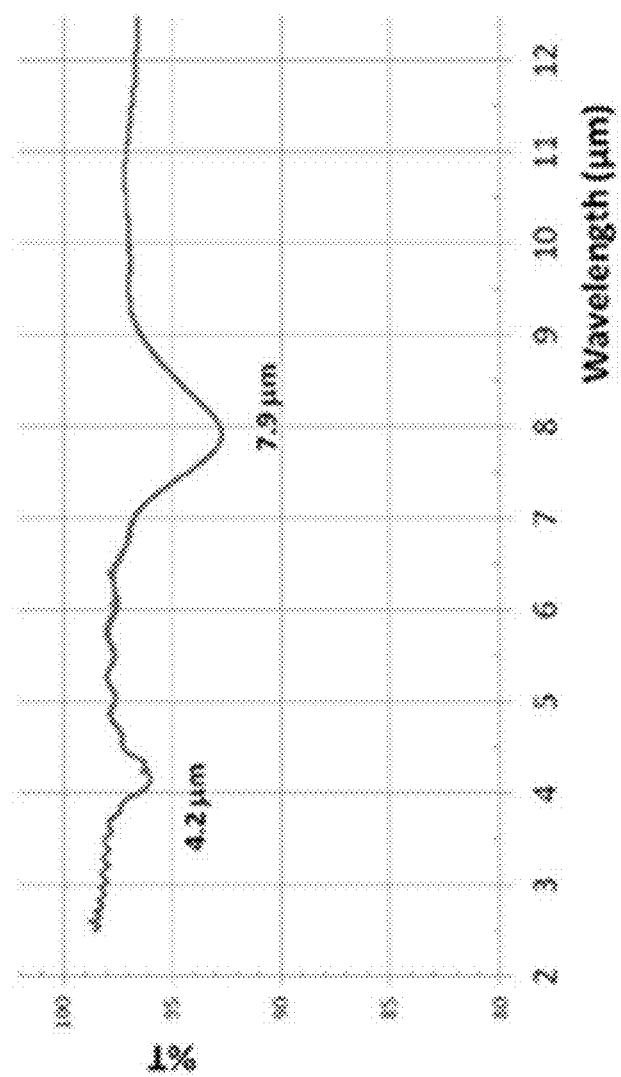
FIG. 4 illustrates an example absorption spectrum of a coupled quantum well nonlinear optical material for a laser frequency converter.

FIG. 2 illustrates a laser frequency converter 200 that employs offset coupled quantum wells to facilitate thermal distribution in the converter. Coupled quantum wells (CQW) are but one example of engineered nanostructures that can provide efficient laser frequency conversion to the IR (MWIR and LWIR) and THz regions, for example. Example absorption measurements on CQW material samples are shown in FIG. 4. Model analysis of second harmonic generation (SHG) and optical parametric amplification (OPA) processes can provide desired trade-off conditions on nonlinearity and absorption to achieve high conversion efficiencies. From such observations and modeling, the laser frequency converter 200 provides a phase-matching device in one example.

The converter 200 includes a bottom and top layer 210 and 220 respectively, each layer having a substrate and associated CQW stacks per layer for nonlinear material which are offset from one another between layers. Heat sinks 230 and 240 can be applied to the substrates 210 and 220 to remove heat from the CQW stacks during frequency conversion. Such offset arrangement can provide an order of magnitude greater beam apertures compared to periodically-poled lithium niobate (PPLN) and orientation-pattered GaAs converters, for example. The larger apertures, zig-zag beam path, and heat loading in thin layers close to the heat sinks 230 and 240 offer converter device configurations that are well suited for high average power applications, for example. In this example, two arrows represent a single laser beam entering the frequency converter as an input along an axis of propagation. The distance between the arrows represents a given beamwidth for single laser signal.

Figure 3:
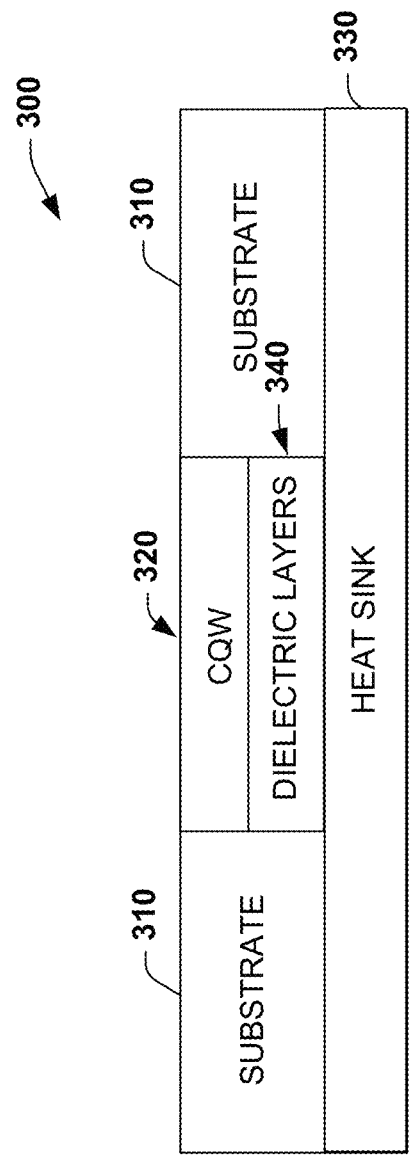
FIG. 3 illustrates an example layer structure for a substrate, a coupled quantum well, and heat sink for a laser frequency converter.

FIG. 3 illustrates an example layer structure 300 for a substrate 310, a coupled quantum well 320, and heat sink 330 for a laser frequency converter. The substrate material 310 can form a plurality of layers, where the heat sink material 330 can be a metallic layer deposited on one of the layers of the substrate material. In another example, the heat sink 330 can be a metal block or other heat removing structure, where the substrate is mounted on the block. The metallic layer can be a copper layer or other heat conductor for example. At least one of the plurality of layers for the substrate material 310 can be a reflective layer to cause the laser signal to reflect and ultimately zig-zag along the axis of propagation. In the example structure 300, the reflective layer includes a range of dielectric layers 340 to reflect the laser signal. The range of dielectric layers can include about 10 dielectric layers to about 100 dielectric layers, for example, to reflect the laser signal. Laser energy not reflected by the dielectric layers 340 after frequency conversion by the CQW 320 can be substantially removed via the heat sink 340.

In one example, the substrate material 310 can be a gallium arsenide (GaAs) substrate. As shown, the nonlinear material described above with respect to FIG. 1 is a coupled quantum well (CQW) 320 for the example structure 300, however, substantially any nonlinear optical material can be employed. Although only a single CQW 320 is shown in the structure 300, a plurality of coupled quantum wells can be situated along the planar surface of the substrate 310. The CQW 320 can also be constructed from one or more layers of nonlinear material.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A laser frequency converter comprising:
   a first substrate material forming a first planar surface comprising:
       a first nonlinear material situated along a portion of the first planar surface of the first substrate material to perform a frequency conversion of a laser signal; and
   a second substrate material forming a second planar surface and separated by a distance from the first planar surface of the first substrate material, the second substrate material comprising:
       a second nonlinear material situated along a portion of the second planar surface of the second substrate material to perform the frequency conversion of the laser signal in conjunction with the first non-linear material, wherein the second nonlinear material is offset from the first nonlinear material along an axis of propagation for the laser signal.

2. The laser frequency converter of claim 1, further comprising a first heat sink material coupled to the first substrate material to conduct heat from the first nonlinear material during the frequency conversion of the laser signal and a second heat sink material coupled to the second substrate material to conduct heat from the second nonlinear material during the frequency conversion of the laser signal.

3. The laser frequency converter of claim 2, wherein each of the first substrate material and the second substrate material form a plurality of layers, wherein the first and second heat sink material is a metallic layer deposited on one of the layers of the first substrate material and the second substrate material, respectively.

4. The laser frequency converter of claim 3, wherein the metallic layer first substrate material and the second substrate material is a copper layer.

5. The laser frequency converter of claim 3, wherein at least one of the plurality of layers for the first substrate material and the second substrate material is a reflective layer to cause the laser signal to zig-zag between the first nonlinear material and the second nonlinear material and to proceed along the axis of propagation.

6. The laser frequency converter of claim 5, wherein the reflective layer comprises a range of dielectric layers to reflect the laser signal, the range of dielectric layers including about 10 dielectric layers to about 100 dielectric layers to reflect the laser signal.

7. The laser frequency converter of claim 1, wherein each of the first substrate material and the second substrate material comprise a gallium arsenide (GaAs) substrate.

8. The laser frequency converter of claim 1, wherein the first nonlinear material and the second nonlinear material comprise a coupled quantum well (CQW).

9. The laser frequency converter of claim 8, further comprising a plurality of coupled quantum wells situated along the first planar surface and a plurality of coupled quantum wells situated along the second planar surface that are offset from the plurality of coupled quantum wells in the first planar surface to cause the laser signal to zig-zag along the axis of propagation.

10. The laser frequency converter of claim 1, wherein the separation distance between the first planar surface and the second planar surface is filled with air or is a vacuum.

11. A laser frequency converter comprising:
a first substrate material forming a first planar surface comprising;
  a first nonlinear material situated along a portion of the first planar surface of the first substrate material to perform a frequency conversion of a laser signal;
  a first heat sink material coupled to the first substrate material to conduct heat from the first nonlinear material during the frequency conversion of the laser signal;
a second substrate material forming a second planar surface and separated by a distance from the first planar surface of the first substrate material, the second substrate material comprising;
  a second nonlinear material situated along a portion of the second planar surface of the second substrate material to perform the frequency conversion of the laser signal in conjunction with the first non-linear material, wherein the second nonlinear material is offset from the first nonlinear material along an axis of propagation for the laser signal; and
  a second heat sink material coupled to the second substrate material to conduct heat from the second nonlinear material during the frequency conversion of the laser signal.

12. The laser frequency converter of claim 11, wherein each of the first substrate material and the second substrate material form a plurality of layers, wherein the first and second heat sink material is a metallic layer deposited on one of the layers of the first substrate material and the second substrate material, respectively.

13. The laser frequency converter of claim 12, wherein at least one of the plurality of layers for the first substrate material and the second substrate material is a reflective layer to cause the laser signal to zig-zag between the first nonlinear material and the second nonlinear material and to proceed along the axis of propagation.

14. The laser frequency converter of claim 13, wherein the reflective layer comprises a range of dielectric layers to reflect the laser signal, the range of dielectric layers including about 10 dielectric layers to about 100 dielectric layers to reflect the laser signal.

15. The laser frequency converter of claim 11, wherein each of the first substrate material and the second substrate material comprise a gallium arsenide (GaAs) substrate.

16. The laser frequency converter of claim 11, wherein the first nonlinear material and the second nonlinear material comprise a coupled quantum well (CQW).

17. The laser frequency converter of claim 16, further comprising a plurality of coupled quantum wells situated along the first planar surface and a plurality of coupled quantum wells situated along the second planar surface that are offset from the plurality of coupled quantum wells in the first planar surface to cause the laser signal to zig-zag along the axis of propagation.

18. The laser frequency converter of claim 11, wherein the separation distance between the first planar surface and the second planar surface is filled with air or is a vacuum.

19. A laser frequency converter comprising:
a first substrate material forming a first planar surface comprising;
  a first coupled quantum well (CQW) situated along a portion of the first planar surface of the first substrate material to perform a frequency conversion of a laser signal;
  a first heat sink material coupled to the first substrate material to conduct heat from the first CQW during the frequency conversion of the laser signal;
a second substrate material forming a second planar surface and separated by a distance from the first planar surface of the first substrate material, the second substrate material comprising;
  a CQW situated along a portion of the second planar surface of the second substrate material to perform the frequency conversion of the laser signal in conjunction with the first CQW, wherein the second CQW is offset from the first CQW along an axis of propagation for the laser signal; and
  a second heat sink material coupled to the second substrate material to conduct heat from the second CQW during the frequency conversion of the laser signal.

20. The laser frequency converter of claim 19, further comprising a plurality of coupled quantum wells situated along the first planar surface and a plurality of coupled quantum wells situated along the second planar surface that are offset from the plurality of coupled quantum wells in the first planar surface to cause the laser signal to zig-zag along the axis of propagation.

* * * * *